United States Patent [19]

Takaragi et al.

[11] Patent Number: 4,969,190
[45] Date of Patent: Nov. 6, 1990

[54] ENCRYPTING SYSTEM OF DATA

[75] Inventors: Kazuo Takaragi, Ebina; Fusao Nakagawa; Yasuhiko Nagai, both of Yokohama; Ryoichi Sasaki, Fujisawa, all of Japan

[73] Assignees: Hitachi, Ltd., Tokyo; Hitachi Control Systems, Inc., Hitachi, both of Japan

[21] Appl. No.: 336,796

[22] Filed: Apr. 12, 1989

[30] Foreign Application Priority Data

Apr. 13, 1988 [JP] Japan .................................. 63-88903

[51] Int. Cl.$^5$ ............................................ H04L 9/02
[52] U.S. Cl. ...................................... 380/43; 380/37; 380/49
[58] Field of Search ...................... 380/42, 29, 28, 43, 380/37, 49

[56] References Cited

U.S. PATENT DOCUMENTS

| | | | |
|---|---|---|---|
| 4,218,582 | 8/1980 | Hellman et al. | 380/30 |
| 4,351,982 | 9/1982 | Miller et al. | 380/49 X |
| 4,405,829 | 9/1983 | Rivest et al. | 380/49 X |
| 4,658,094 | 4/1987 | Shamir et al. | 380/28 X |
| 4,759,063 | 7/1988 | Chaum | 380/28 X |

OTHER PUBLICATIONS

Shin Hitotsumatsu, "Study of Data Protection and Encrypting", pp. 52-61, 1983.
Shoji Miyaguchi, "A Fast Computing Scheme for RSA Public-Key Cryptosystem and Its VLSI Organization", pp. 53-61.

Primary Examiner—Thomas H. Tarcza
Assistant Examiner—Tod Swann
Attorney, Agent, or Firm—Antonelli, Terry, Stout & Kraus

[57] ABSTRACT

A data encrypting system according to the CBC system involves a limitation in a range of a numerical value which expresses data (smaller than a predetermined integer N). The encrypting system has an encrypting apparatus including a block encrypting section for receiving data, which is expressed by an integer value X smaller than a predetermined integer value N, for executing a data conversion $$C = \text{enc}(X)$$

where $0 \leq C \leq N-1$ using an RSA algorithm, and for outputting C; and an arithmetic operating section connected to receive data, as one input, which is expressed by an integer value M smaller than the integer value N, and the output C of the block encrypting section as the other input, for performing an arithmetic operation for both of the inputs so that a resultant arithmetic value is smaller than the integer value N, and for outputting the arithmetic value as an input of the block encrypting section. Further, a decoding apparatus has a block decoding section for receiving data which is expressed by an integer value C smaller than the integer value N, for executing an inverse conversion $$Y = \text{dec}(C)$$

of the encrypting for the input signal by using the RSA algorithm; and a modulo subtracting section for subtracing the input data C from the output Y of the block decoding section and for outputting a remainder M'

$$M' = Y - C \pmod{N}$$

which is derived by dividing a resultant subtracted value by the integer value N.

13 Claims, 3 Drawing Sheets

ENCRYPTING SYSTEM OF DATA

BACKGROUND OF THE INVENTION

The present invention relates to an encrypting apparatus for encrypting data to be recorded or data to be transferred and for keeping the security of information, a decoding apparatus, an encryption communication system, an encrypting method, a decoding method, and an encryption communication system in an information management system or an information communication system. Particularly, the invention relates to a system which is optimum to encrypt by using an RSA algorithm.

In general, in the information system, a method whereby data is encrypted to protect the security of data which is stored into a file or data which flows on a transmission path is one of the effective methods.

Hitherto, for instance, a data encrypting system such as an RSA algorithm or the like which was published by R. L. Rivest, A. Shamir, and L. Adleman of the Massachusetts Institute of Technology has been described in detail in Shin Hitotsumatsu, "Study of Data Protection and Encrypting", published by Nihon Keizai Shimbun Inc., pages 52 to 61, 1983.

FIG. 1 shows a circuit diagram of the foregoing conventional system for encrypting data by using a block encryptor of 64 bits. FIG. 2 shows a circuit diagram of the above conventional system for decoding the data of the cryptogram in FIG. 1.

In FIG. 1, a block encryptor 101 is an apparatus for converting arbitrary data (data of one block) having a length of 64 bits into a ciphertext also having a length of 64 bits by using an encrypting key (code) 104. An exclusive OR device 102 is an apparatus for operating the exclusive OR at the corresponding bit positions for two arbitrary data each having the length of 64 bits and for outputting the resultant data of 64 bits. Reference numeral 103 denotes a delay buffer to delay an output of the block encryptor 101 by the time of one block. In the system, the following processes are executed in the case of encrypting data M. (In the following description, symbols C, M, X, Y, and the like denote both of the cases where data is indicated and where numerical values of data are indicated.)

(1) The data M is divided into blocks $M_1, M_2, \ldots$ each having the unit length of 64 bits.

(2) The first block $M_1$ passes through the exclusive OR device 102 and is encrypted by the block encryptor 101 by the following equation.

$$C_1 = enc(M_1)$$

Data $C_1$ of 64 bits is output as the first ciphertext block.

(3) The exclusive OR of the second block $M_2$ and the ciphertext block $C_1$ is get by the exclusive OR device 102.

$$X_2 = M_2 \oplus C_1$$

where, $\oplus$ denotes the exclusive OR. $X_2$ is encrypted by the block encryptor.

$$C_2 = enc(X_2)$$

Data $C_2$ of 64 bits is output as the second ciphertext block.

(4) in a manner similar to the above blocks $M_3, \ldots$ of the third and subsequent blocks are also sequentially converted into the ciphertext blocks $C_3, \ldots$ and are outputted by the following equations.

$$X_3 = M_3 \oplus C_2, \quad C_3 = enc(X_3), \ldots$$

After the ciphertext blocks $C_1, C_2, \ldots$ which had been converted as mentioned above were stored into files or transmitted to others, they can be decoded by the decoding system of FIG. 2. In FIG. 2, reference numeral 201 denotes a block decoder; 202 an exclusive OR device; 203 a delay buffer to delay data by the time of one block length; and 205 a decoding key.

(1) A ciphertext C is divided into blocks $C_1, C_2, \ldots$ each having the unit length of 64 bits.

(2) The first block $C_1$ is decoded by the block decoder 201.

$$M_1 = dec(C_1)$$

The data $M_1$ of 64 bits passes through the exclusive OR device 202 and is outputted as the first plaintext block.

(3) The second block $C_2$ is decoded by the block decoder.

$$X_2 = dec(C_2)$$

The exclusive OR of $X_2$ and the ciphertext block $C_1$ is get by the exclusive OR device 202.

$$M_2 = X_2 \oplus C_1$$

The data $M_2$ of 64 bits is outputted as the second plaintext block.

(4) In a manner similar to the above, the third and subsequent blocks $C_3, \ldots$ are also sequentially converted into the plaintext blocks $M_3, \ldots$ and are outputted.

The encrypting system as shown in FIGS. 1 and 2 is called a Cipher Block Chaining (CBC) system. Such a system is an excellent system in which the input signal of the encryptor corresponds to the exclusive OR of the data input and the output of the encryptor which is preceding by one block, it is extremely difficult to decrypt the ciphertext by a third person. Moreover, since the logic of the exclusive OR can be easily constructed by hardware and its inverse logic is also the exclusive OR, there is an advantage such that the common logic hardware can be used for the encrypting section and decoding section.

However, in the CBC system, the following problems occur in the case of using the block encryptor according to the system such as the foregoing RSA algorithm which uses a condition as a prerequisite in which only the data of the number smaller than a predetermined numerical value N can be encrypted.

That is, there occurs a problem such that in FIGS. 1 and 2, at the stage of operating the exclusive OR in the item (3) mentioned above, even when the input data of the exclusive OR device is smaller than a predetermined integer value N, its output (result) exceeds the numerical value N, so that the input data cannot be correctly encrypted nor decoded.

SUMMARY OF THE INVENTION

It is an object of the present invention to provide an encrypting system in which value of data in a block which is encrypted and decoded is limited to a predetermined value N (N is an integer) in any cases in a data encrypting system by the CBC system in which there is a limitation (smaller than N) in a range of numerical values which express data.

An encrypting system of the present invention to accomplish the above object is constructed in the following manner. That is, an encrypting apparatus comprises: a block encrypting section for receiving data, as an input signal, which is expressed by an integer value X smaller than a predetermined integer value N, for executing a data conversion $$C = enc(X)$$

where, C is an integer value and $0 \leq C \leq N-1$ for the input signal by using an RSA algorithm, and for outputting the C; and an arithmetic operating section for receiving data, input, which is expressed by an integer value M smaller than the integer value N, for receiving the output C of the block encrypting section as the other input, for performing an arithmetic operation for both of the inputs so that a resultant arithmetic value is smaller than the integer value N, and for outputting the arithmetic value as an input of the block encrypting section. Further, a decoding apparatus comprises: a block decoding section for receiving data, as an input signal, which is expressed by an integer value C smaller than the predetermined integer value N, for executing an inverse conversion $$Y = dec(C)$$

of the encrypting for the input signal by using the RSA algorithm, and for outputting the Y; and a modulo subtracting section for subtracting the input data C from the output Y of the decoding section and for outputting a remainder M'

$$M' = Y - C \pmod{N}$$

which is derived by dividing a resultant subtracted value by the integer value N.

DESCRIPTION OF THE PREFERRED EMBODIMENT

Figure 1:
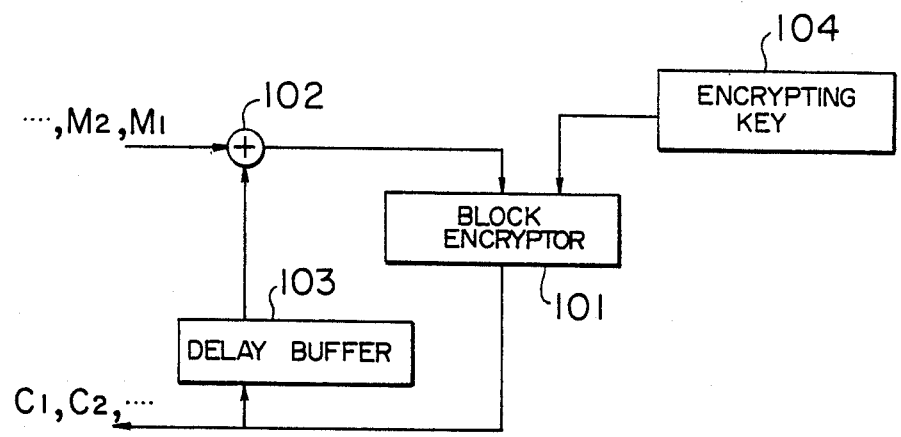
FIG. 1 is a constructional diagram of a conventional data encrypting apparatus.
Figure 2:
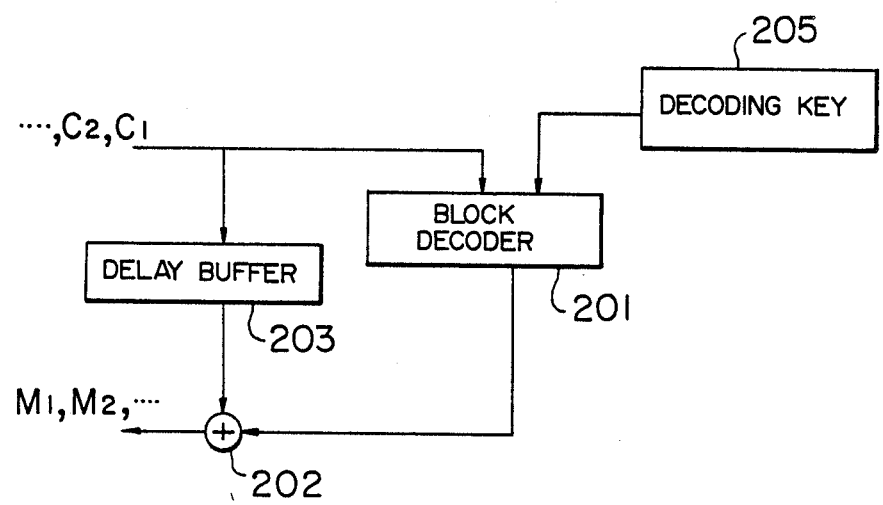
FIG. 2 is a constructional diagram of a conventional data decoding apparatus.
Figure 3:
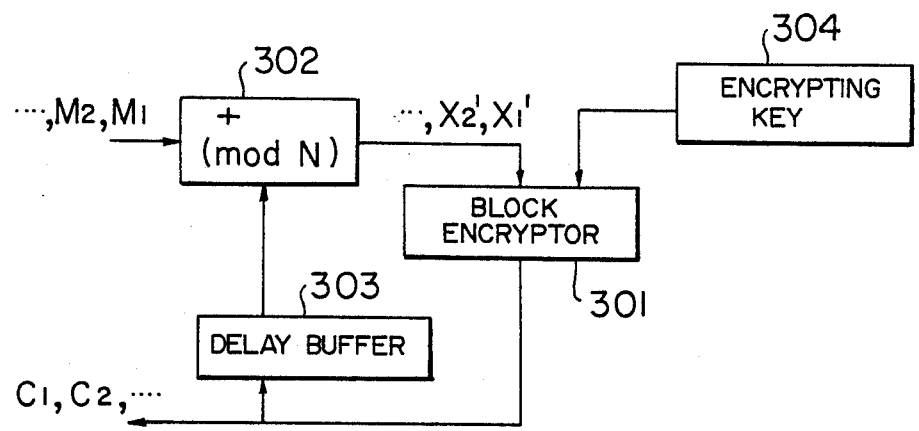
FIG. 3 is a constructional diagram of an encrypting apparatus according to the present invention.

FIG. 3 is a circuit diagram of an encrypting apparatus of an embodiment of the present invention.

In FIG. 3, reference numeral 301 denotes a block encryptor in which one block consists of 512 bits; 302 indicates a modulo adder of 512 bits; 303 a delay buffer to delay data by a time of one block length; and 304 an encrypting key.

Figure 4A:
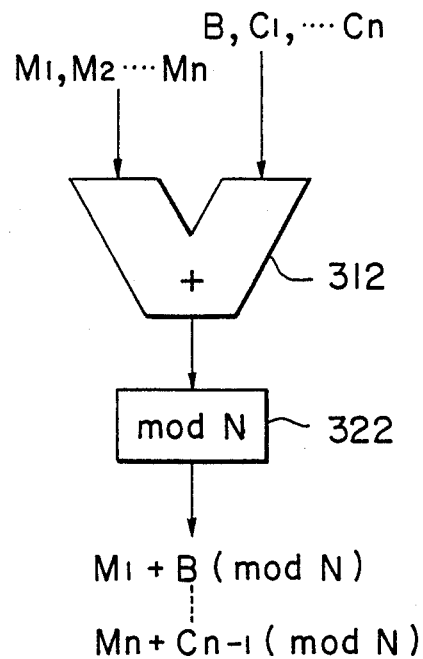
FIGS. 4A and 4B are constructional diagrams of modulo arithmetic units of an encrypting system in the present invention.

A digital signal replaced to numerical values is used as data to be encrypted. The digital signal is divided into a plurality of blocks ($M_1, M_2, M_3, \ldots, M_n$) each consisting of, for instance, 511 bits as one block and is sequentially encrypted on a block unit basis. Among the numerical values which are expressed by a binary signal of 512 bits, $2^{512}-1$ is the maximum value. However, in the RSA algorithm, there is a limitation such that the numerical values of this value N (512 bits) or more cannot be encrypted. Assuming that the number of bits (digits) of the block is 512, it takes an astronomical time to mathematically decrypt the decoding key even by the processes by any high speed computer. It is practically impossible to decrypt it. The modulo adder 302 receives data $M_1, M_2, \ldots, M_n$ (n=1, 2, 3, ...) smaller than a predetermined integer value N and also receives data B, $C_1, \ldots, C_{n-1}$, and $C_n$ smaller than the integer value N from the delay buffer 303. Then, the modulo adder 302 outputs a remainder $X_1$ which is derived by dividing the sum of $M_1$ and B by N, remainders $X_2, \ldots$ which are obtained by dividing the sum of $M_n$ and $C_{n-1}$ by N. B denotes an initial value and is an arbitrary predetermined numerical value smaller than N. The sum of $M_1$ and B and the sum of $M_n$ and $C_{n-1}$ are the ordinary arithmetical sums. In any case, the remainders $X_1, X_2, \ldots, X_n$ are always smaller than the integer value N. The block encryptor 301 receives the output data $X_1, X_2, \ldots, X_n$ of the modulo adder 302 and the encrypting key 304 and outputs ciphertext data $C_1, C_2, \ldots$ FIG. 4A shows an example of a construction of the modulo adder 302. Reference numeral 312 denotes an adder and 322 indicates a modulo arithmetic unit for dividing an output of the adder 312 by N and for obtaining the remainder of the division. Each of those functional elements can be accomplished by a well-known circuit. An encryptor using the well-known RSA algorithm can be used as the block encryptor 301. For instance, a practical circuit construction is disclosed in Shoji Miyaguchi, "A Fast Computing Scheme for RSA Public-Key Cryptosystem and Its VLSI Organization", The Papers of the Society of Information Processing of Japan, Vol. 24, No. 6, pages 764 to 771, 1983.

Figure 5:
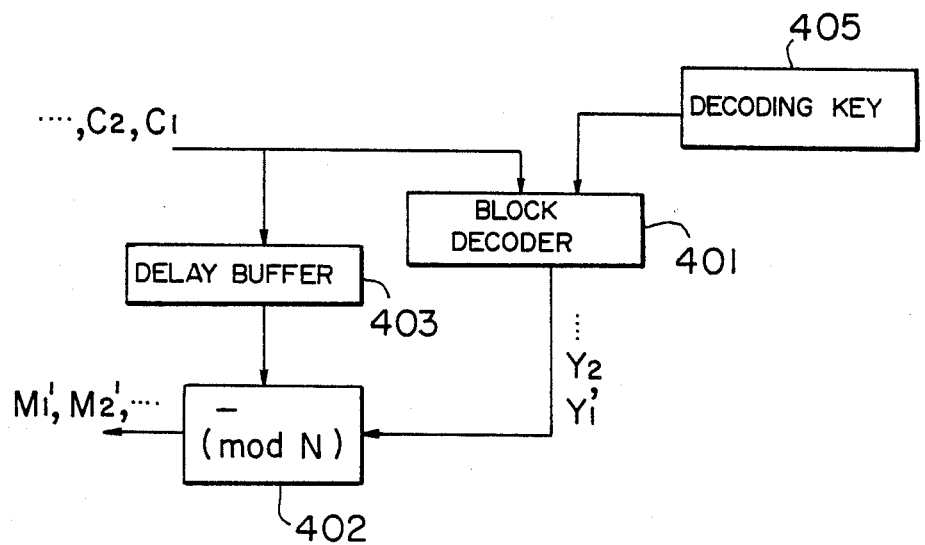
FIG. 5 is a constructional diagram of a decoding apparatus according to the invention.

FIG. 5 is a circuit diagram of a decoding apparatus in an embodiment of the invention for storing or transmitting the ciphertext data formed by the embodiment of FIG. 3 and for, thereafter, decoding.

In FIG. 5, reference numeral 401 denotes a block decoder; 402 indicates a modulo subtracter; 403 a delay buffer to delay data by a time of one block length; and 405 a decoding key. The ciphertext data $C_1, C_2, \ldots, C_n$ formed by the encrypting apparatus in FIG. 3 are input to the delay buffer 403 and to the block decoder 401. The block encryptor 401 receives the ciphertext data $C_1, C_2, \ldots, C_n$ and the decoding key 405 and outputs decoding data $Y_1, Y_2, \ldots, Y_n$. The delay buffer 403 receives the ciphertext data $C_1, C_2, \ldots, C_n$ and outputs the data B, $C_1, C_2, \ldots, C_{n-1}$. The modulo subtracter 403 receives the data B, $C_1, C_2, \ldots, C_{n-1}$ from the delay buffer 403 and also receives the data $Y_1$ and $Y_n$ from the block decoder 401. The modulo subtracter 403 then outputs a remainder $M_1$ which is derived by subtracting B from $Y_1$ and by dividing the subtracted data by N and also outputs remainders $M_1', \ldots, M_n'$ which are obtained by subtracting $C_{n-1}$ from $Y_n$ and by dividing the subtracted data by N.

Figure 4B:
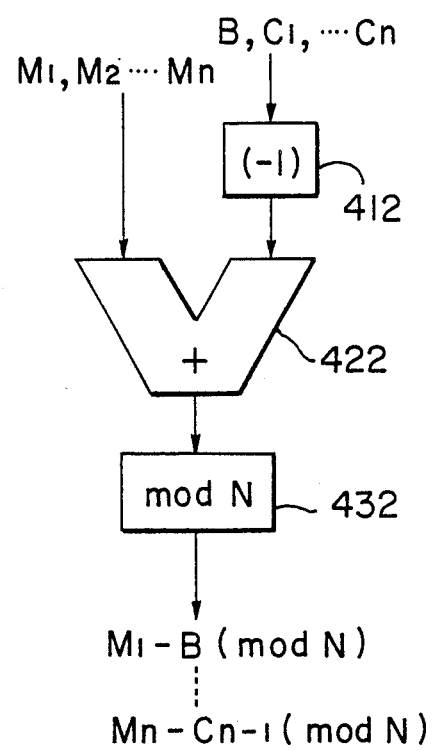

FIG. 4B shows an example of a practical internal construction of the modulo subtracter 402. Reference numeral 412 denotes an inverter to invert the polarity of an input signal; 422 indicates an adder; and 432 represents a modulo arithmetic unit for dividing an output of the adder 422 by N and for obtaining the remainder. Each of those functional elements can be realized by the well-known circuit. The elements other than the inverter 412 can use the same elements as those in FIG. 4A. The block decoder 401 has a function to perform the inverse conversion of the block encryptor 302 and can be realized by the well-known apparatus.

According to the embodiments of FIGS. 3 and 5 mentioned above, the encryption by the CBC mode can be executed by using the block encryptor and block decoder for encrypting and decoding numerals smaller than a predetermined number N. That is, the encrypting and decoding are executed by the following equations.

(1) Encrypting (FIG. 3)

$$C_1 = \text{enc}(M_1 + B(\text{mod } N))$$

$$C_2 = \text{enc}(M_2 + C_1(\text{mod } N))$$

$$C_3 = \text{enc}(M_3 + C_2(\text{mod } N)) \ldots$$

$$C_n = \text{enc}(M_n + C_{n-1}(\text{mod } N))$$

(2) Decoding (FIG. 5)

$$M_1' = \text{dec}(C_1) - B \ (\text{mod } N)$$

$$M_2' = \text{dec}(C_2) - C_1(\text{mod } N)$$

$$M_3' = \text{dec}(C_3) - C_2(\text{mod } N) \ldots$$

$$M_n' = \text{dec}(C_n) - C_{n-1}(\text{mod } N)$$

where, $$M_1' = \text{dec}(C_1) - B(\text{mod } N)$$

$$= \text{dec}(\text{enc}(M_1 + B(\text{mod } N))) - B(\text{mod } N)$$

$$= (M_1 + B(\text{mod } N)) - B(\text{mod } N)$$

$$= M_1(\text{mod } N) + B(\text{mod } N) - B(\text{mod } N)$$

$$= M_1(\text{mod } N)$$

$$= M_1$$

$$M_2' = \text{dec}(C_2) - C_1(\text{mod } N)$$

$$= \text{dec}(\text{enc}(M_2 + C_1(\text{mod } N))) - C_1(\text{mod } N)$$

$$= (M_2 + C_1(\text{mod } N)) - C_1(\text{mod } N)$$

$$= M_2$$

With respect to $M_n'$, the encrypting and decoding are also correctly executed in a manner similar to the above.

As mentioned above, according to the embodiment, in any of the encrypting and decoding systems, the numerical values of data do not exceed the predetermined value N. A situation in which the encrypting and decoding cannot be executed does not occur.

In addition to the embodiments of the modulo adder and subtracter shown in FIGS. 4A and 4B, the invention can be also applied to the case where the adder and subtracter are replaced to a multiplier and a divider. In such a case, outputs of the modulo multiplier and modulo divider become $$M_n \times C_{n-1}(\text{mod } N) \text{ and}$$

$$M_n \div C_{n-1}(\text{mod } N) = M_n \times C_{n-1}^{-1} \ (\text{mod } N)$$

where $C_{n-1}^{-1}$ is a reciprocal number of $C_{n-1}$ in (mod N). In any of those outputs, the numerical values are always smaller than the predetermined integer value N.

As described in detail above, according to the data encrypting system of the invention, when performing the encrypting and decoding in the CBC mode, by using the modulo adder and modulo subtracter, the encrypting and decoding are executed so as not to produce data exceeding the predetermined integer value N. Therefore, desired encrypting and decoding can be also always executed for any data input.

I claim:

1. A data encrypting apparatus using a cipher block chaining system, comprising:
   block encrypting means for receiving data, as an input signal, which is expressed by an integer value X smaller than a predetermined integer value N, for executing a data conversion $$C = \text{enc}(X)$$

where, C is an integer value and $0 \leq C \leq N - 1$ for said input signal by using an RSA algorithm, and for outputting said C; and
   arithmetic operating means, connected to receive data, as one input, which is expressed by an integer value M smaller than said integer value N, and the output C of said block encrypting means as the other input, for executing a predetermined expression using values of both of said one input and said other input, said predetermined expression providing a solution whose value is smaller than the integer value N, said value of the solution being applied to said block encrypting means as said input signal.

2. A data encrypting apparatus using a cipher block chaining system, comprising:
   block encrypting means for receiving data, as an input signal, which is expressed by an integer value X smaller than a predetermined integer value N, for executing a data conversion $$C = \text{enc}(X)$$

where, C is an integer value and $0 \leq C \leq N - 1$ for said input signal by using an RSA algorithm, and for outputting said C; and
   modulo adding means for receiving data, as one input, which is expressed by an integer value M smaller than said integer value N, for receiving the output C of said block encrypting means as the other input, for adding both of said inputs and obtaining a remainder X'

$$X' = M + C \ (\text{mod } N)$$

which is derived by dividing a resultant added value by said integer value N, and for outputting said remainder X' as an input of the block encrypting means.

3. A data encrypting apparatus for receiving data, as a unit block, which is expressed by a numerical value smaller than a predetermined integer value N and for sequentially encrypting said block data, comprising:
   block encrypting means for receiving data, as an input signal, which is expressed by an integer value $X_n$ (n is the block number and n = 1, 2, 3, ...) smaller than said integer value N, for executing a data conversion $$C_n = enc(X_n)$$

where, $C_n$ is an integer value and $0 \leq C_n \leq N-1$ for said input signal by using an RSA algorithm, and for outputting said $C_n$; and modulo adding means for receiving data, as one input, which is expressed by an integer value $M_n$ smaller than said integer value N, for receiving an output $C_{n-1}$ of said block encrypting means as the other input, for adding both of the inputs and obtaining a remainder $X_n$ $$X_n = M_n + C_{n-1} \pmod{N}$$

which is derived by dividing a resultant added value by said integer value N, and for outputting said remainder $X_n$ as an input of the block encrypting means.

4. An apparatus according to claim 3, wherein said modulo adding means uses a predetermined value B ($0 \leq B \leq N-1$) in place of said $C_{n-1}$ as the other input which is added to the first block input $M_1$.

5. An apparatus according to claim 4, wherein said modulo adding means includes means for delaying the output of said block encrypting means by a time of one block length.

6. An apparatus for decoding data which was encrypted by a cipher block chaining system, comprising:
block decoding means for receiving data, as an input signal, which is expressed by an integer value C smaller than a predetermined integer value N, for executing an inverse conversion $$Y = dec(C)$$

of the encrypting for said input signal by using an RSA algorithm, and for outputting said Y; and
modulo subtracting means for subtracting said input data C from the output Y of said block decoding means and for outputting a remainder M'

$$M' = Y - C \pmod{N}$$

which is derived by dividing a resultant subtracted value by said integer value N.

7. A data decoding apparatus for receiving data $C_n$, as s unit block, which is expressed by a numerical value smaller than a predetermined integer value N which was encrypted and for sequentially decoding said block data, comprising:
block decoding means for receiving data, as an input signal, which is expressed by an integer value $C_n$ (n is the block number and N = 1, 2, 3, ...) smaller than said integer value N, for executing an inverse conversion $$Y_n = dec(C_n)$$

of the encrypting for said input signal by using an RSA algorithm, and for outputting said $Y_n$; and
modulo subtracting means for subtracting said input data $C_{n-1}$ from the output $Y_n$ of said block decoding means and for outputting a remainder $M_n$ $$M_n = Y_n - C_{n-1} \pmod{N}$$

which is derived by dividing a resultant subtracted value by said integer value N.

8. An apparatus according to claim 7, wherein said modulo subtracting means uses a predetermined value B ($0 \leq B \leq N-1$) in place of said $C_{n-1}$ as input data which is subtracted from the first output $Y_1$ of said block decoding means.

9. An apparatus according to claim 8, wherein said modulo adding means further includes means for delaying the output of said block decoding means by a time of one block length.

10. An encrypting communication system for receiving data, as a unit block, which is expressed by a numerical value smaller than a predetermined integer value N, for sequentially encrypting said block data, and for decoding said encrypted data, comprising:
block encrypting means for receiving data, as an input signal, which is expressed by an integer value $X_n$ (n is the block number and n = 1, 2, 3, ...) smaller than said integer value N, for executing a data conversion $$C_n = enc(X_n)$$

where, $C_n$ is an integer value and $0 \leq C_n \leq N-1$ for said input signal by using an RSA algorithm, and for outputting said $C_n$;
modulo adding means for receiving data, as one input, which is expressed by an integer value $M_n$ smaller than said integer value N, for receiving the output $C_{n-1}$ of said block encrypting means as the other input, for adding both of said inputs and obtaining a remainder $X_n$ $$X_n = M_n + C_{n-1} \pmod{N}$$

which is derived by dividing a resultant added value by said integer value N, and for outputting said remainder $X_n$ as an input of the block encrypting means;
block decoding means for receiving the output $C_n$ of the block encrypting means as an input signal, for executing an inverse conversion $$Y_n = dec(C_n)$$

of the encrypting for said input signal by using the RSA algorithm, and for outputting said $Y_n$; and
modulo subtracting means for subtracting said input data $C_{n-1}$ from the output $Y_n$ of said block decoding means, and for outputting a remainder $M_n$ $$M_n = Y_n - C_{n-1} \pmod{N}$$

which is derived by dividing a resultant subtracted value by said integer value N.

11. A data encrypting method whereby data which is expressed by a numerical value smaller than a predetermined integer value N is input as a unit block and said block data is sequentially encrypted, comprising the steps of:
receiving data, as an input signal, which is expressed by an integer value $X_n$ (n is the block number and n = 1, 2, 3, ...) smaller than said integer value N and executing a data conversion $$C_n = enc(X_n)$$

where, $C_n$ is an integer value and $0 \leq C_n \leq N-1$ for said input signal by using an RSA algorithm;

receiving data, as one input, which is expressed by an integer value $M_n$ smaller than said integer value N, receiving an output $C_{n-1}$ of said data conversion as the other input, adding both of said inputs, and calculating a remainder $X_n$ $$X_n = M_n + C_{n-1} \ (\text{mod } N)$$

which is derived by dividing a resultant added value by said integer value N; and giving said resultant arithmetic value $X_n$ as an input of said data conversion.

12. A data decoding method whereby data $C_n$ which is expressed by a numerical value smaller than a predetermined integer value N which was encrypted is inputted as a unit block and said block data is sequentially decoded, comprising the steps of:

receiving data, as an input signal, which is expressed by an integer value $C_n$ (n is the block number and n=1, 2, 3, . . . ) smaller than said integer value N and executing an inverse conversion $$Y_n = \text{dec}(C_n)$$

of the encrypting for said input signal by using an RSA algorithm; and subtracting said input data $C_{n-1}$ from the output $Y_n$ of said inverse conversion and calculating a remainder $M_n$ $$M_n = Y_n - C_{n-1} \ (\text{mod } N)$$

which is derived by dividing a resultant subtracted value by said integer value N.

13. An encryption communicating method whereby data which is expressed by a numerical value smaller than a predetermined integer value N is inputted as a unit block, said block data is sequentially encrypted, and said encrypted data is decoded, comprising the steps of:

receiving data, as an input signal, which is expressed by an integer value $X_n$ (n is the block number and n=1, 2, 3, . . . ) smaller than said integer value N and executing a data conversion $$C_n = \text{enc}(X_n)$$

where, $C_n$ is an integer value and $0 \leq C_n \leq N-1$ for said input signal by using an RSA algorithm;

receiving data, as one input, which is expressed by an integer value $M_n$ smaller than said integer value N, receiving an output $C_{n-1}$ of said data conversion as the other input, adding both of said inputs, and calculating a remainder $X_n$ $$X_n = M_n + C_{n-1} \ (\text{mod } N)$$

which is derived by dividing a resultant added value by said integer value N;

receiving the output $C_n$ of said data conversion as an input signal and executing an inverse conversion $$Y_n = \text{dec}(C_n)$$

of said data conversion for said input signal by using the RSA algorithm; and subtracting said input data $C_{n-1}$ from the output $Y_n$ of said inverse conversion and calculating a remainder $M_n$ $$M_n = Y_n - C_{n-1} \ (\text{mod } N)$$

which is derived by dividing a resultant subtracted value by said integer value N.

* * * * *